Patented Nov. 25, 1941

2,263,661

UNITED STATES PATENT OFFICE 2,263,661

COMPOSITE PRODUCT

William Walker, London, England, assignor to Celanese Corporation of America, a corporation of Delaware No Drawing. Application April 8, 1939, Serial No. 266,822. In Great Britain April 28, 1938

1 Claim. (Cl. 154—45.9)

This invention relates to composite products, and in particular to laminated materials made up of ply wood and covered with sheets or foils of a thermoplastic composition having a basis of a cellulose derivative.

Compositions having a basis of cellulose acetate or other cellulose derivatives possess properties which render them very suitable for use for decorative purposes. Thus, these compositions are durable, take a high polish and are very easily coloured and ornamented by the application of designs or patterns thereto. However, serious difficulties have been met with when attempting to apply a sheet or foil of such a composition to a wooden panel. In particular warping of the wooden panel takes place even when this is relatively thick and consists of a number of plies.

According to the present invention laminated material, which is free or substantially free from liability to warp, comprises a wooden panel made up of a number of wood plies secured to each other by means of a water-resistant adhesive, and adhering to the outer surfaces of the panel sheets of a thermoplastic composition having a basis of a cellulose derivative. This material may be made by applying to each face of a suitable wooden panel a sheet of the thermoplastic composition, and causing the sheets to adhere to the panel by means of high pressure, preferably with the aid of an adhesive.

It is most important that the wooden panel should be provided with a sheet of the cellulose derivative plastic on each face and that the plies of the wooden panel should be united by means of a water-resistant adhesive. Phenolaldehyde condensation products of the Bakelite (Reg. trade-mark) type have been found very suitable, in particular the initial (soluble and fusible) condensation product prepared in presence of alkali. Water-resistant adhesives having a basis of other synthetic resins may, however, be employed, some urea formaldehyde resins being quite suitable for the purposes of the invention, for instance the product sold as Kaurit. W. Such condensation products may be employed dissolved in a suitable solvent, for example, alcohol, acetone, glycerol, or ethyl acetate, if desired together with a plasticiser, e. g. diethyl phthalate, according to the particular resin employed. The adhesive composition may be applied directly to the wood, but in practice it is found more convenient to apply the composition to tissue paper, dry the product and interleave the impregnated paper and wood plies and subject the assembly to heat and pressure in order to form a composite product.

The sheet of cellulose derivative composition is caused to adhere to the wooden panel by the application of high pressure and preferably with the aid of an adhesive, a nitro-cellulose solution being very effective in practice, especially when the sheet has a basis of cellulose acetate. The use of relatively high pressure, for instance, pressures of 150–250 pounds per square inch, is preferable, and not only results in the production of a product in which the various layers are strongly united, but may also have the effect of increasing the hardness and resistance to scratching of the sheets of cellulose derivative.

The sheets of cellulose acetate or other cellulose derivative composition employed may be quite thin, e. g. 5 thousandths of an inch or even less, but thicker sheets may be used, although there is usually no advantage in using sheets of more than 20 thousandths of an inch thickness. The sheets may be ornamented before being applied to the wooden panel; for instance a design resembling an ornamental wood may be printed on the sheets, preferably on the side which is to be applied to the wood.

Although it is usually preferable to employ cellulose acetate as the basis of the thermoplastic sheets, other cellulose derivatives may be used, e. g. cellulose propionate, cellulose butyrate or benzyl cellulose. The sheets may contain besides the cellulose acetate or other cellulose derivative any desired plasticiser, for instance an alkyl phthalate or an organic phosphate, e. g. tricresyl phosphate, and they may, if desired, contain pigments, dyestuffs or other colouring or effect materials.

Having described my invention what I desire to secure by Letters Patent is:

A substantially non-warping panel composed of a number of co-extensive wood plies, adjacent faces of said plies being united by means of plies of thin paper impregnated with a water-resistant urea formaldehyde resin, said panel having foils of cellulose acetate united to the outer faces thereof by means of nitrocellulose.

WILLIAM WALKER